United States Patent [19]
Belmont et al.

[11] Patent Number: 5,537,663
[45] Date of Patent: Jul. 16, 1996

[54] SYSTEM FOR DETERMINING CONFIGURATION OF DEVICES INSTALLED ON A COMPUTER BUS BY COMPARING RESPONSE TIME OF DATA LINES TO READ FROM I/O ADDRESS WHEN UNDRIVEN

[75] Inventors: Brian V. Belmont; Barry S. Basile, both of Houston, Tex.

[73] Assignee: Compaq Computer Corporation, Houston, Tex.

[21] Appl. No.: 145,338

[22] Filed: Oct. 29, 1993

[51] Int. Cl.[6] .......................... G06F 11/00; G06F 11/08; G06F 11/34
[52] U.S. Cl. .......................... 395/837; 395/835; 395/500; 395/650; 395/183.19; 371/67.1; 371/71; 364/929.4; 364/929.71; 364/241.9
[58] Field of Search ...................... 395/275, 500, 395/800, 828, 835, 837, 183.19, 650; 371/67.1, 71

[56] References Cited

U.S. PATENT DOCUMENTS

| | | | |
|---|---|---|---|
| 4,641,261 | 2/1987 | Dwyer et al. | 364/900 |
| 4,691,296 | 9/1987 | Struger | 364/900 |
| 4,999,805 | 3/1991 | Culley et al. | 364/900 |
| 5,161,102 | 11/1992 | Griffin et al. | 395/800 |
| 5,166,939 | 11/1992 | Jaffe et al. | 371/40.1 |
| 5,257,387 | 10/1993 | Richek et al. | 395/800 |
| 5,263,148 | 11/1993 | Jones, Jr. et al. | 395/500 |
| 5,353,432 | 10/1994 | Richek et al. | 395/500 |
| 5,367,640 | 11/1994 | Hamilton et al. | 395/275 |

OTHER PUBLICATIONS

Intel Corporation/Microsoft Corporation Plug And Play ISA Specification, Version 1.0 (May 28, 1993).
EISA Specification, Appendix To U.S. Pat. No. 5,101,492, issued Mar. 31, 1992 To Schultz, et al., pp. i–xi, 1–54, 97–134, 213–227, 294–429.

*Primary Examiner*—Thomas G. Lee
*Assistant Examiner*—Rehana Perveen Krick
*Attorney, Agent, or Firm*—Pravel, Hewitt, Kimball & Krieger

[57] ABSTRACT

In a system that executes the method according to the invention, each slot on the system bus is individually enabled at start-up and each address of an address range is read to determine whether an expansion board is installed in the slot and is responding to a read from that I/O address. If the data value returned by the I/O read is not equal to the undriven value of the data bus, then it is known that the expansion board is responding to that I/O address. Otherwise, a second read of the I/O address is performed, and the values of certain control lines on the system bus are latched to determine whether an expansion board is driving those lines in response to the I/O read. If so, again it is known that an expansion board is responding to a read from that I/O address. Otherwise, the system then performs a further special I/O read to determine the data bus response time. If the response time is faster than the response time of an undriven bus, it is known that an expansion board is responding to this I/O address. In this way, an I/O address map is created for each expansion board. This map is then used to determine the system configuration by comparing the map to standard signatures of known boards. The system configuration is the passed to standard configuration software.

10 Claims, 7 Drawing Sheets

|  | DRIVEN | READ | LATCH | RISE |
|---|---|---|---|---|
| 100h | 0 | FF | - | - |
| 101h | 0 | FF | - | - |
| 102h | 0 | FF | - | - |
| 103h | 0 | FF | - | - |
| 104h | FF | 10 | - | - |
| 105h | FF | 12 | - | - |
| 106h | FF | F0 | - | - |
| 107h | 0 | FF | - | - |
| " | " | " | • | • |
| " | " | " | • | • |
| 3FFh | 0 | FF | - | - |

*FIG. 5A*

| DRIVEN | READ | LATCH | RISE |
|---|---|---|---|
| FF | FF | 02 | - |
| FF | FF | 00 | 05 |
| 0 | FF | 00 | 1B |
| 0 | FF | 00 | 1C |
| FF | 10 | - | - |
| FF | 12 | - | - |
| FF | F0 | - | - |
| 0 | FF | 00 | 1C |
| • | • | • | • |
| • | • | • | • |
| 0 | FF | 00 | 1B |

*FIG. 5B*

SYSTEM FOR DETERMINING CONFIGURATION OF DEVICES INSTALLED ON A COMPUTER BUS BY COMPARING RESPONSE TIME OF DATA LINES TO READ FROM I/O ADDRESS WHEN UNDRIVEN

RELATED APPLICATIONS

This application is related to co-pending Ser. No. 08/145,400, now pending filed Oct. 10, 1993, entitled "Method of and Apparatus for Disabling Individual Slots on a Computer Bus," and to co-pending Ser. No. 08/145,339, filed Oct. 10, 1993, now pending entitled "Detecting the Presence of a Device on a Computer System Bus by Measuring the Response Time of Data Signals on the Bus, and Maximizing System Performance Based on that Response Time," all of which have been assigned to the assignee of this application.

BACKGROUND OF THE INVENTION

1. Field of the Invention

The invention relates to computer busing systems, and more particularly to a method of and apparatus for determining the configuration and types of boards installed on a computer bus.

2. Description of the Related Art

The microcomputer industry has experienced tremendous growth over the last twenty years. From the days of its infancy when only a few interested "hackers" could fathom its quirks and nuances, the microcomputer has now evolved into a powerful business and personal tool found on virtually every office desk and in virtually every home.

The microcomputer's road to success has not been without its problems, however. While advances occur at an astounding pace, those advances must accommodate the standards found in the then existing base of microcomputer systems. This is known as upwards compatibility. To maintain such compatibility, the industry has seen one microcomputer standard laid on top of another, with a resulting hodgepodge of standards-within-standards that designers must maintain to allow existing users to upgrade their equipment. These multiple standards gradually shed their oldest layers, replacing them with new layers reflecting the state-of-the-art. In this way, only the very oldest microcomputer systems become obsolete.

One early idea to enhance microcomputer systems was the addition of hardware enhancing boards. These boards were generally plugged into a system bus to provide added functionality, such as telecommunications, disk storage, and improved video. These boards obviously had to Conform to some standard. With the introduction of the IBM PC by International Business Machines Corp., and the later introduction of the PC/AT by IBM, the AT system bus soon became a de facto standard known as the Industry Standard Architecture bus, or the ISA bus. The AT bus accommodated both the 8-bit boards of the PC and newer 16-bit boards developed for the AT. Third-party manufacturers could economically design standard boards compatible with the wide variety of IBM PC and AT compatible microcomputer systems.

Further advances in microprocessor technology, however, pushed the ISA bus to its limits. For this reason, another "layer" was added to the ISA bus standard. This added layer became known as the Extended Industry Standard Architecture bus, or the EISA bus. Boards designed for the EISA bus had more pins, providing a wider data path for information to flow through the microcomputer system bus, analogous to adding lanes to a highway. The EISA bus also added more address lines to the standard, permitting more memory locations to be individually specified, much as would adding more digits to a phone number or a zip code.

One limitation of the ISA bus involved its method of handling I/O addressing. An address enable signal (AEN) was driven low by an ISA bus master to indicate to all of the cards that the currently asserted address was an I/O address or a memory address rather than a direct memory access (DMA) operation. But because AEN was asserted low to all cards, each card had to be physically configured to respond to a different range of I/O or memory addresses to avoid conflicts. This address differentiation was usually accomplished when installing the boards by setting microswitches on dual in-line packages (DIP) or by connecting jumpers on each board. Improperly setting these switches could result in conflicts on a read or write to a particular I/O or memory address and could even result in physical hardware damage.

While the ISA standard provided 16 bits of I/O addressing, in developing boards for PC-compatible computers, vendors often only used or decoded the lower 10 bits. Thus, to be fully compatible with the available boards, the I/O address space of the ISA bus effectively was only from 0 to 03FFh. Thus, a large portion of the I/O space was unusable.

The EISA bus standard has resolved this problem to some extent. The EISA bus definition provides for a conflict-free I/O address space for each slot. This is fully described in U.S. Pat. No. 4,999,805 and the EISA Specification, Version 3.1, which is Appendix 1 of U.S. Pat. No. 4,101,492, both of which are hereby incorporated by reference. The expansion board manufacturers include a configuration file with each EISA expansion board, and optionally, with switch programmable ISA products. A configuration utility program provided by the system manufacturer uses the information contained in the configuration files to determine a conflict-free configuration of the system resources. The configuration utility stores the configuration and initialization information into non-volatile memory and saves a backup copy on diskette. Details of this configuration process are provided in Ser. No. 07/293,315, U.S. Pat. No. 5,263,148 Nov. 16, 1993 entitled "Method and Apparatus for Configuration of Computer System and Circuit Boards," allowed on May 10, 1993, which is hereby incorporated by reference. The system ROM power up routines use the initialization information to initialize the system during power up, and device drivers use the configuration information to configure the expansion boards during operation.

However, this slot specific addressing does not help with ISA boards. Slot specific ISA board disabling can prevent such physical conflicts between two boards during their initialization. Briefly, a mask register is provided to mask off the AEN signal to selected slots. Details are provided in Ser. No. 08/145,400 now pending entitled "Method of and Apparatus for Disabling Individual Slots on a Computer Bus," filed concurrently herewith, which is hereby incorporated by reference.

Further, the slot specific addressing is of no assistance with memory operations, as the EISA bus standard does not provide for slot specific memory spaces for ISA cards.

Determining what addresses that board responds to is not trivial. Unlike EISA boards, ISA boards do not provide an identification register. Thus, the occupied address space of an ISA board must be determined in some other way.

It would be desirable to provide the functionality of EISA configuration software for ISA boards. That is, it would be desirable for the system to be able to determine what ISA boards were installed in which slots, and to appropriately respond to any conflicts or mismapping of those devices. Finally, it would be desirable to determine where an ISA board is mapped in the address and memory space and to configure the system accordingly.

SUMMARY OF THE INVENTION

In a computer system constructed according to the invention, initialization software determines whether an expansion board is present in a selected slot and what input/output (I/O) addresses that selected expansion board drives. The system first disables all the expansion slots except for the one under test. The system then cycles through all the relevant I/O addresses, creating a map of the I/O addresses to which an expansion board in the enabled expansion slot responds. A response other than a normal undriven bus value indicates an installed board in the enabled slot is driving the data bus in response to a read from that I/O address. The returned value is stored in the map. For each I/O address from which the system reads a normally undriven bus response (0FFh in typical systems), this is stored in the map as an "undriven" response for further testing.

The system further tests each address returning such an "undriven" response to determine whether an installed board is actually driving the bus to that normally undriven value. First, if the expansion slot under test asserts certain bus control lines in response to an I/O read, that indicates that an installed device is responding to that I/O read. If so, that response is stored in the map.

If not, the system then analyzes the data line response time to an I/O read at the address being tested. Specifically, the system measures how long the data lines take to rise to an undriven state of 0FFh from an artificially driven state of 00h. Hardware first drives the data lines to zero at the beginning of an I/O read cycle. The hardware then times the rise time of the data lines. Because the response time for a driven bus is less than that for an undriven bus, a timer value less than the normal response time indicates that a device is actually driving the normally undriven value onto the data bus. Thus, the particular expansion slot under test both contains an expansion board and that board is driving the bus in response to a read from the I/O address under test.

In this way, the system creates a map of the I/O address locations used by a board in a selected expansion slot and the actual response values of that board. Configuration software then determines the actual board type by comparing the I/O map with "signatures" compiled for various known expansion boards. Once the board type and its address map are known, the configuration software passes that information to an extended version of EISA configuration software, which both sets up device drivers and otherwise configures the system. Further, the EISA configuration software determines whether there are any conflicts between the expansion boards installed into the various slots of the system bus. If so, the EISA configuration software can warn the user, can suggest to the user the proper switch settings, or can even disable the board entirely.

Further according to the invention, a corresponding memory map of an ISA board is created in a manner similar to that for creating an I/O address map. The technique is similar, except memory "response time" need not be checked to determine if a memory address is being driven, as instead, two different predetermined values are written to that memory location and then read back. If those values are properly stored, the corresponding value will be returned on a read. If the values are not properly stored, the read will return a value other than what was written on at least one of the reads. This map is also then used by the configuration software.

BRIEF DESCRIPTION OF THE DRAWINGS

A better understanding of the present invention can be obtained when the following detailed description of the preferred embodiment is considered in conjunction with the following drawings, in which:

FIGS. 5A and 5B are exemplary address maps created by the software of FIGS. 3 and 4.

DETAILED DESCRIPTION OF THE PREFERRED EMBODIMENT

Figure 1:
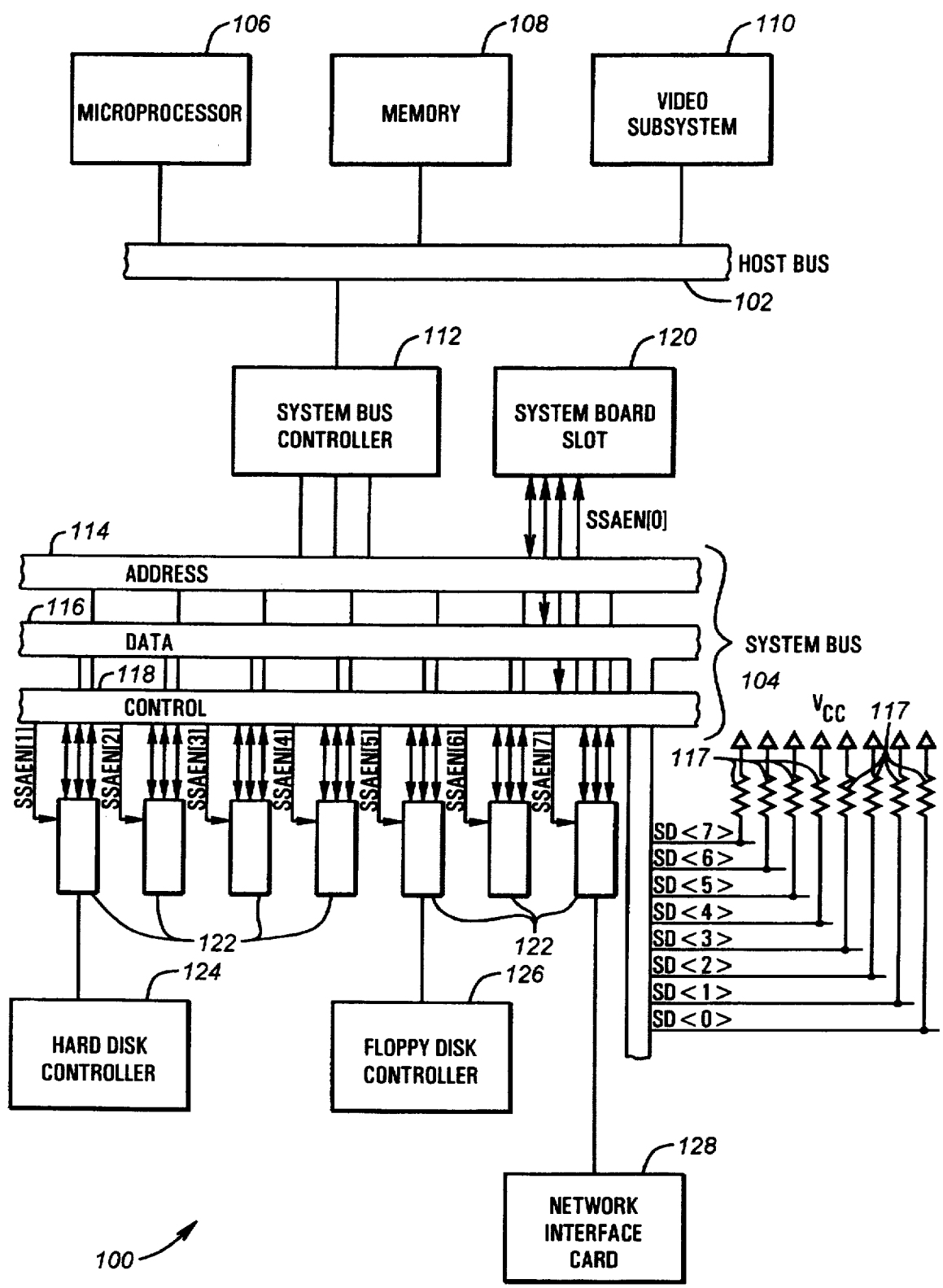
FIG. 1 is a block diagram of a computer system incorporating the method and apparatus according to the invention.

Turning now to the drawings, FIG. 1 is a block diagram of a microcomputer system 100 in which the method and apparatus according to the invention is implemented. The microcomputer system 100 includes a host bus 102 and a system bus 104. A microprocessor 106, memory 108, and a video subsystem 110 internally communicate at high speed with each other over the host bus 102. The host bus 102 is designed for speed rather than expansion, so the host bus 102 has little, if any, provision for expansion boards.

A system bus controller 112 provides an interface between the host bus 102 and system bus 104. The system bus controller 112 is located on the system board of the microcomputer system 100. The system bus controller 112 is preferably implemented using an application specific integrated circuit (ASIC) but could be implemented using discrete components.

The system bus 104 is typically an EISA bus, but could be another bus using similar addressing protocols. The system bus controller 112 implements the functions of an EISA bus controller. It is also within the system bus controller 112 that the data bus response time circuitry according to the invention is preferably implemented.

The system bus 104 consists of address lines 114, data lines 116, and control lines 118. Connected to the system bus 104 is a system board slot 120. The system board slot 120 is not a separate physical connection, but instead logically connects "devices" integrated into the system board of the microcomputer system 100 itself to the system bus 104. Further connected to the system bus 104 are slots 122. The slots 122 are physical connectors for inserting expansion boards compatible with the standard of the system bus 104 to provide the added functionality to the microcomputer system 100. Shown inserted in the first, fifth, and seventh of the slots 122 are respectively a hard disk controller 124, a floppy disk controller 126, and a network interface board 128.

The lower byte of the data lines 116, denoted as SD[7..0], are pulled up by pull-up resistors 117. These pull-up resistors 117 ensure that the undriven data lines 116 return a value of 0FFh. The EISA standard specifies that these pull-up resistors 117 should be 8.2 k ohm.

As is further discussed below, the pull-up resistors 117 can instead be pull-down resistors. In such a case, the value returned by an I/O read of an undriven data bus is then 00h instead of 0FFh.

Each device connected to the system bus 104, whether a device plugged into one of the slots 122 or a system board device corresponding to the system board slot 120, includes an individual slot specific address enable line SSAEN[Z], where Z equals 0 to 7. These signals correspond to the AENx signals of the EISA specification or AEN signal for ISA systems, but further implementing slot specific disabling.

Figure 2:
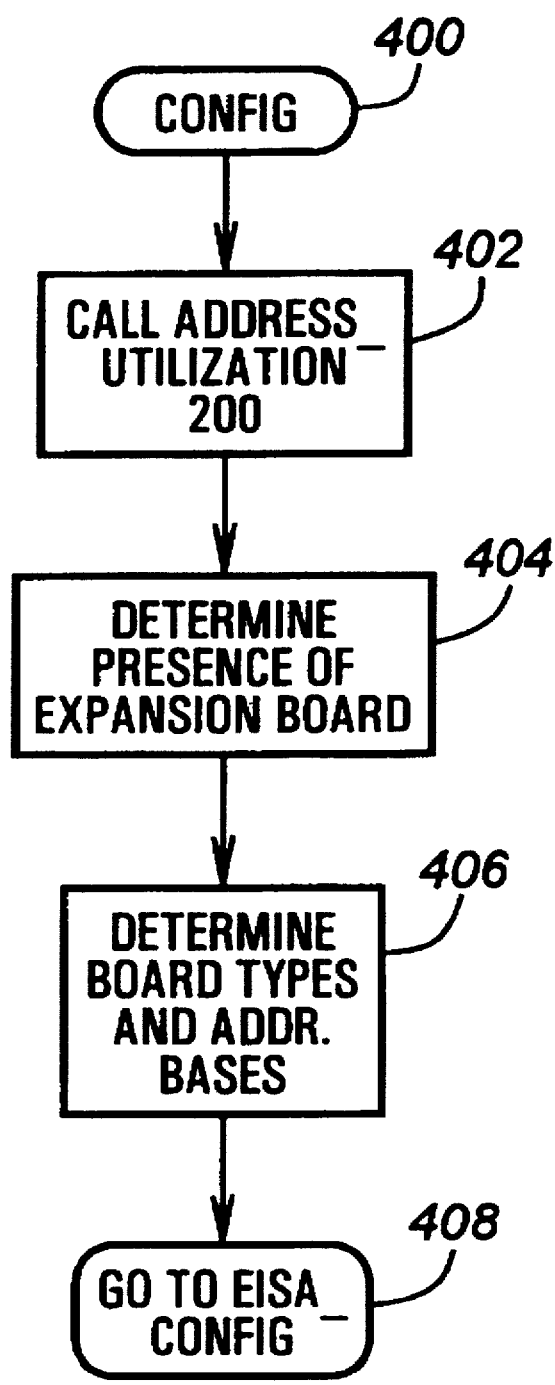
FIG. 2 is a flowchart of configuration software that determines the system configuration according to the invention.

FIG. 2 is a flowchart of a routine CONFIG 400 that uses address maps provided by a routine ADDRESS_UTILIZATION 200, discussed below in conjunction with FIGS. 3 and 4, to determine board presence and to check for conflicts among the slots 122. Beginning at step 402, the routine CONFIG 400 calls the routine ADDRESS_UTILIZATION 200, retrieving an address map for each of the slots 122, as is discussed below in conjunction with FIGS. 5A and 5B. The routine CONFIG 400 then proceeds to step 404, where it determines the presence or absence of an expansion board in each of the slots 122.

This is done by checking the address map discussed below in conjunction with FIGS. 5A and 5B to see if any address locations were responsive to I/O reads when that particular slot 122 was enabled. That address map preferably indicates the values read from each I/O address, the values on the control lines 118 on a read from each I/O address, and the rise times of the data lines 116 if the address otherwise appears unresponsive. Based on these values, the address map also indicates whether the particular I/O address is responsive. If all of the I/O addresses were indicated to be unresponsive, then no ISA expansion board or EISA expansion board with ISA functions occupies that particular slot 122.

The routine ADDRESS_UTILIZATION 200 also determines the presence of EISA boards in slots by reading from the EISA identification registers. If an EISA board does in fact occupy a slot 122, the address maps discussed above and below in conjunction with FIGS. 5A and 5B need not be checked, as the EISA configuration registers both indicate board presence and uniquely identify those expansion boards.

From step 404, the routine CONFIG 400 proceeds to step 406, where it attempts to determine the board types and address spaces using signature analysis routines. The system software includes a library of ISA boards and their address space signatures. A "signature" is a definition of the possible address spaces occupied by a board used to (hopefully) uniquely identify both the functions on and the types of boards installed. For example, a parallel port may return a unique configuration of bits on an I/O read. That configuration is the "signature" of the parallel port function on an expansion board. An expansion board implementing four such ports might have four such parallel port "signatures" spaced four I/O addresses apart each. Such parallel port "signatures" plus the port spacings would then form that expansion board's signature. Each board may have multiple signatures, in that each board may include more than one logical device or function. In that case, the signature of the board would represent more than a single device, and both of those determined "devices" could be passed to further configuration software for configuration of each of those devices. Using this library, the routine determines the various ISA boards installed in the system.

From step 406, the routine CONFIG 400 then passes the identifications and selected base addresses of the ISA boards, along with the identifications of the installed EISA boards, to expanded EISA configuration software EISA_CONFIG at step 408. This EISA configuration software can further resolve conflicts or inform the user of such conflicts, and can complete the configuration of the system, including setting up the device drivers to properly drive each installed board. This EISA configuration software is more fully described in Ser. No. 07/293,315, U.S. Pat. No. 5,263,148, Nov. 16, 1993 entitled "Method and Apparatus for Configuration of Computer System and Circuit Boards," which is hereby incorporated by reference. That EISA configuration software relies on the board IDs returned by the identification registers of EISA boards and on saved configurations for ISA boards.

Figure 3:
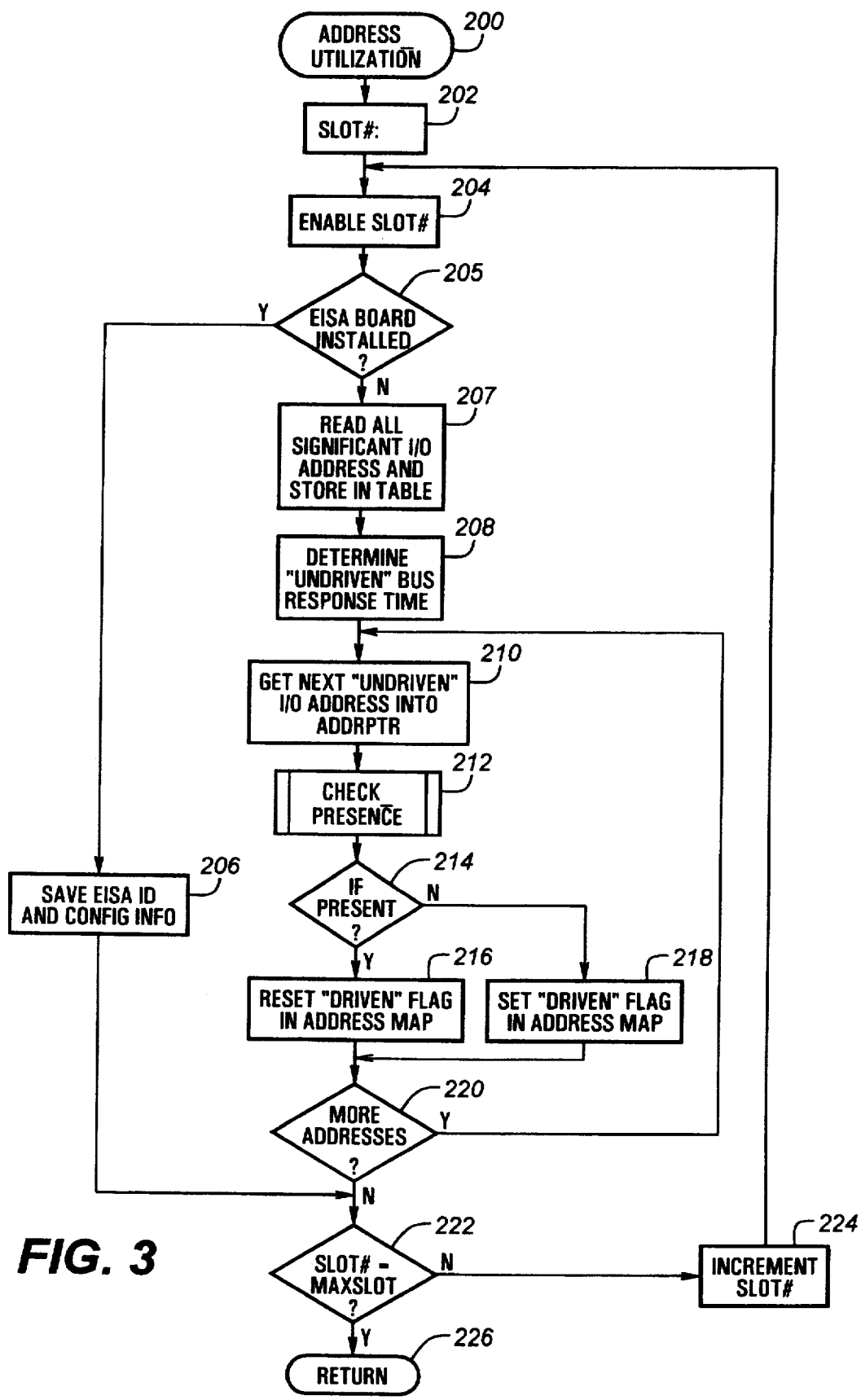
FIGS. 3 and 4 are flowcharts of software used to implement the method according to the invention.

FIG. 3 is a flowchart of the routine ADDRESS_UTILIZATION 200 that determines both the presence of an expansion board in a slot 122 and, if present, the particular addresses that device uses.

Beginning at step 202, the routine ADDRESS_UTILIZATION 200 sets a variable SLOT# equal to one. This variable corresponds to the specific slot 122 under test on the system bus 104. Proceeding to step 204, the routine enables the slot 122 that corresponds to SLOT# by writing to an arbitrary I/O address P_SSAEN used to disable the remaining slots 122. Writing zeros to all the bits of P_SSAEN except the bit corresponding to SLOT# prevents all of the slots 122 except SLOT# from responding to any I/O operations. Even if enabled, the slot 122 SLOT# only responds if a board is both installed and mapped to a particular I/O address under test.

For example, if SLOT# equals 3, the routine writes 00001000b (08h) to I/O address P_SSAEN. A write to that address stores that value in a mask register which then prevents the AENx signal from going low to the disabled slots. This selective slot disabling is further described in Ser. No. 08/145,400, (now pending) referenced above.

In the first time through the routine ADDRESS_UTILIZATION 200, SLOT# equals one, enabling the first of the slots 120. Because the designers of the system 100 know the I/O address map of the system board slot 120, the system startup software can skip mapping the system board slot 120 (SLOT# equal to zero) and proceed straight to SLOT# equal to one.

Proceeding to step 205, the routine ADDRESS_UTILIZATION 200 determines whether an EISA board is installed in the slot 120 SLOT#. This is done by reading I/O addresses containing EISA board identification information, as defined by the EISA Specification, Version 3.1, referenced above. An EISA board need not be mapped because the identification registers uniquely define that board. So, if an EISA board is detected, the routine proceeds to step 206 where it saves that identification information for later use by the EISA configuration software, and then to step 222 to process the next slot 120.

If no EISA board is detected at step 205, the routine ADDRESS_UTILIZATION 200 then proceeds to step 207, where it reads all significant I/O addresses and stores the read values in an address map. In this embodiment, the routine only needs to read I/O addresses an ISA expansion board would use, or the address range 0100h to 03FFh. ISA systems only effectively employ ten significant address bits SA[9..0] on the address lines 114 of the system bus 104. Further, bits SA[9..8] equalling zero corresponds to an ISA system board address in the system board slot 126 or to an EISA address. ISA expansion boards should not respond to system board addresses, so the routine need only examine those 10-bit addresses in which SA[9..8] do not equal zero. The significant address range is therefore 0100h to 03FFh. Addresses with bits SA[15..10] other than zero are also disregarded, because in an ISA system these addresses are generally considered to be aliases of the I/O addresses located in the ten address bit expansion board range. Thus, by checking an address range of 0100h to 03FFh, the routine maps all I/O addresses used by an ISA board.

As noted above, addresses in which bits SA[9..8] equal zero can correspond not only to ISA system board addresses but also to EISA addresses. Under the EISA standard, EISA board addresses are handled through circuitry that enables a specific slot enable SSAEN[X] when SA[9..8] equal zero, with X corresponding to the four high order bits of the full 16-bit address, or SA[15..12]. Thus, EISA devices installed in the slots 122 will not conflict with each other because each slot 122 has its own separate EISA address range.

In reading the significant addresses at step 206, the microprocessor 106 will read an 0FFh if no device is installed in the slot 122 under test or if the device is not mapped to the I/O address read. This results from the pull-up resistors 117 pulling the data lines 116 high. Conversely, reading a value other than 0FFh indicates the slot 122 has an enabled device mapped to the I/O address read. In such a case, the routine stores a "true" flag in the address map indicating this I/O address is occupied by a device in the slot 122 SLOT# under test. In either case, the data value read is stored in the address map.

For simplicity, memory locations are not tested. Occupation of certain I/O addresses alone should be enough to establish a unique signature for a particular board under test. At that time, a memory check can be performed if desired.

However, simply because an I/O read returns 0FFh does not mean that a device in the slot 122 under test is not driving the data lines 116. A device installed in the slot 122 may be driving the data lines 116 to the normally undriven value of 0FFh. The routine ADDRESS_UTILIZATION 200 later, at step 212, determines this by checking whether the device under test asserts certain control lines in response to an I/O read from the address under test and, if not, whether the response time of the data lines 116 to an I/O read is quicker than the response time of an undriven bus.

At step 208, the routine ADDRESS_UTILIZATION 200 determines the response time of the undriven data lines 116. First, the routine enables a rise time measurement mode by writing an enabling bit to a status/control register at an arbitrary I/O address P_CTRLSTAT. The routine then disables all of the slots 122 by writing 00h to P_SSAEN. The routine then reads from an ISA expansion board I/O address in rise time measurement mode. This read operation is special as the data lines 116 are first driven to zero and then a timer is started. The timer is stopped upon the data lines 116 reaching predefined voltage levels or upon reaching a predetermined timer value limit. In this case, because all slots 122 are disabled, no installed device can respond. The routine then reads the value of the timer from an arbitrary I/O address P_TIMER. This returns the rise time in HCLKs, or host bus 102 clock cycles, for a read of an undriven I/O address after first driving the data bus to zero. The hardware enabled by the rise time mode bit written to P_CTRLSTAT performs the precharging of the data lines 116 to logic zero and then the timing of the bus rise time to a value other than logic zero. This hardware is preferably implemented in the system bus controller 112 in FIG. 1, and is further described in Ser. No. 08/145,339 (now pending) entitled "Detecting the Presence of a Device on a Computer System Bus by Measuring the Response Time of Data Signals on the Bus," which is hereby incorporated by reference. This undriven data line 116 response time is saved for later comparisons.

At step 210, the routine ADDRESS_UTILIZATION 200 stores in an address pointer variable ADDRPTR the next I/O address determined to be "undriven". The first time through this inner loop, the first I/O address is the first I/O address in the address map created at step 206 that returned a normally undriven I/O read value of 0FFh. The routine 200 then proceeds to step 212, where it checks for the assertion of control lines 118 in response to a read and checks the rise time of the data lines 116 during a read from the I/O address pointed to by ADDRPTR. This is done in a routine CHECK_PRESENCE 212, discussed below in conjunction with FIG. 3.

Proceeding to step 214, if the routine CHECK_PRESENCE 212 determined a device actually drove 0FFh onto the data lines 116, then at step 216 the routine ADDRESS_UTILIZATION 200 stores a true value into a flag in the address map that indicates the address was responsive to a read. Otherwise, the routine ADDRESS_UTILIZATION 200 instead proceeds to step 218, where it stores a false value in that flag, indicating the address was non-responsive to a read. That is, any device, if present, in the slot 122 under test is not mapped to this address.

From both steps 216 and 218, the routine ADDRESS_UTILIZATION 200 proceeds to step 220, where it determines whether any I/O addresses that initially returned 0FFh remain in the address map. If so, the routine proceeds again to step 210, where it stores the next "undriven" I/O address in the map into ADDRPTR. If no such addresses remain, the routine proceeds from step 220 to step 222.

At step 222, the routine ADDRESS_UTILIZATION 200 determines whether SLOT# equals MAXSLOT. In an EISA system, this could be up to 14, the greatest number of non-system board slots EISA systems support. Because the system designers actually know how many slots 122 are present in the system 100 the designers can set MAXSLOT equal to the appropriate number in the configuration software. This eliminates the mapping of slots 122 that are not present.

If SLOT# is not equal to MAXSLOT, the routine ADDRESS_UTILIZATION 200 proceeds to step 224, where it increments SLOT#, and then proceeds to step 204 to enable that next slot 122. The entire loop is repeated, creating another address map of the I/O addresses to which a device in the next slot 122 responds.

If at step 222 SLOT# equals MAXSLOT, then the routine ADDRESS_UTILIZATION 200 is done checking for I/O address utilization and has created its address maps, so it returns to the configuration software CONFIG 400.

Figure 4:
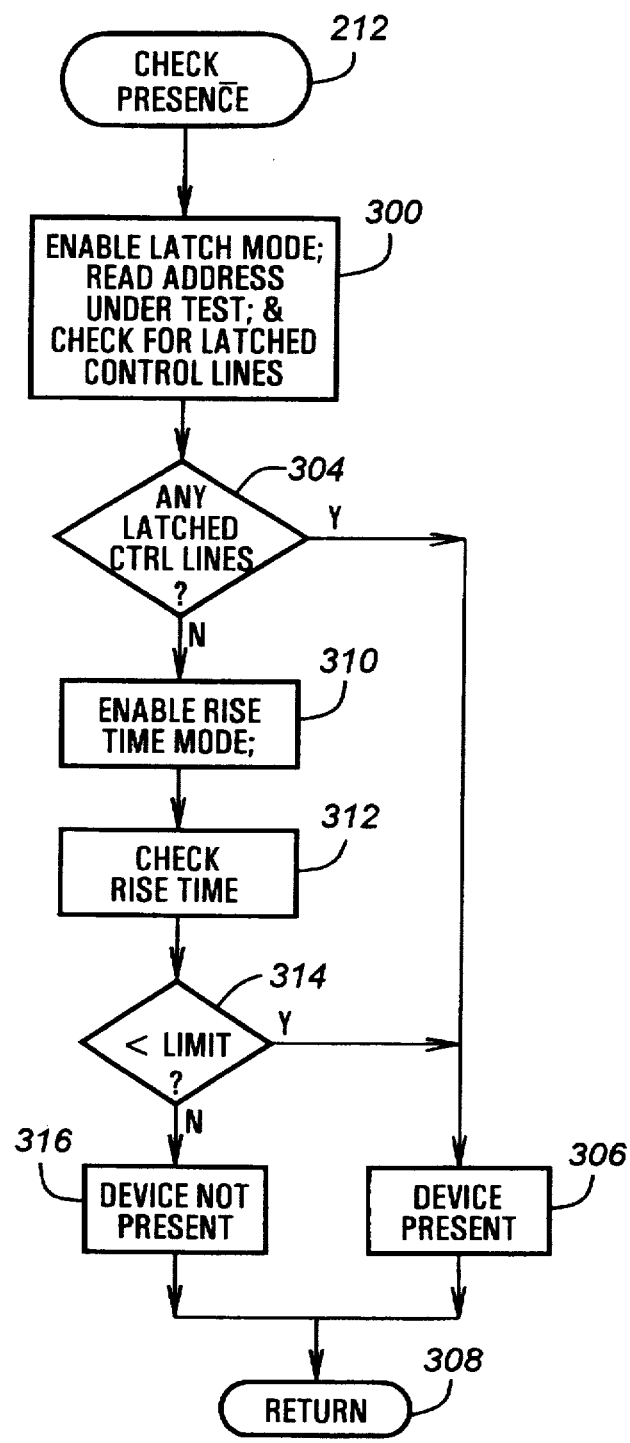

FIG. 4 is a flowchart of the routine CHECK_PRESENCE 212. This routine uses the rise time circuitry as shown and described in Ser. No. 08/145,339, (now pending) previously referenced, to determine the response times of the data lines 116. This routine also uses latching circuitry described in conjunction with FIGS. 6 and 7 to determine expansion board presence.

The routine CHECK_PRESENCE 212 begins at step 300 by enabling a latching mode by writing a bit to the arbitrary port P_CTRLSTAT previously discussed. On an EISA or ISA system, some expansion boards respond to I/O reads by asserting certain control lines among the control lines 118. They may do so even if they drive the data bus to 0FFh. If these control lines are asserted on an I/O read, the selected expansion board of slot 122 is mapped to that I/O address, so no further testing need be done. The hardware for implementing this latching mode is described below in conjunction with FIGS. 6 and 7; it essentially latches the values of certain control lines 118 at appropriate times in a I/O read cycle.

At step 300, with the latching mode now enabled, the routine CHECK_PRESENCE 212 then performs an I/O read from the address under test pointed to by ADDRPTR. The routine then reads the arbitrary register P_CTRLSTAT, which returns the latched values of the particular control lines mentioned above. The routine then stores that returned value in the address map.

Proceeding to step 304, the routine CHECK_PRESENCE 212 examines the latched value read at step 302 to see if an expansion board has driven the control lines 118. If so, the routine proceeds to step 306, where it sets a return parameter to true, indicating that a read from this address results in a response from an expansion board in the slot 122 that is enabled. The routine then returns that parameter at step 308.

If at step 304 it was determined that no expansion board asserted any of the relevant control lines 118 in response to a read, the routine CHECK_PRESENCE 212 proceeds to step 310. Even though an expansion board, if any, in the slot 122 under test failed to assert these lines, this does not necessarily mean that an expansion board in the slot 122 under test is not driving the data lines 116 in response to a read from the I/O address ADDRPTR. The routine at step 310 further determines expansion board presence by enabling the rise time mode by writing a particular bit to the arbitrary port P_CTRLSTAT discussed above.

The routine then proceeds to step 312, where it checks the rise time of the data lines 112 in response to a read from the address under test ADDRPTR. This is accomplished by the hardware in Ser. No. 08/145,339, (now pending) referenced above. To summarize, this hardware first drives the data lines 116 to 00h and then counts the number of HCLKs until one of those data lines 116 changes to one. The routine then reads that timer at an arbitrary I/O address P_TIMER. As discussed in Ser. No. 08/145,339, (now pending) the choice of using pull-up resistors 117 and driving an initial value of 00h onto the data lines 116 is not the only way to implement this hardware. Values other than 00h could be used in conjunction with the data bus compare register, and the rise time could be based on the time it takes all, rather than just one, of the data lines 116 to change from their initial values. In any case, a response time at least a certain number of clock cycles (such as 2 HCLKs) less than the rise time of the undriven data lines 116 as determined and stored at step 208 above indicates an expansion board is driving the normally "undriven" value onto the data lines 116. Thus, the slot 122 under test contains an expansion board that is responding to an I/O read from the location ADDRPTR. This rise time is stored in the address map and the rise time mode is disabled.

Proceeding to step 314, this rise time is compared to that undriven bus rise time stored at step 208. If this rise time is less than the undriven rise time by a certain number of HCLKs added for random fluctuations in rise time, the routine proceeds to step 306, setting its return parameter to true. Otherwise, the routine CHECK_PRESENCE 212 proceeds from step 314 to 316, where it resets its return parameter to false, indicating a device is not responding to a read from ADDRPTR. The routine then returns the true or false parameter at step 308. Before returning, the routine disables the rise time mode.

The specific order in which the address map is created is arbitrary. For example, the routine CHECK_PRESENCE 212 could be executed as each address is initially mapped at step 207, rather than performing a separate loop to detect expansion board presence at "undriven" addresses. Similarly, the latch control line checking of steps 302 and 304 could be combined with the initial mapping of step 207, because such latching does not interfere with an I/O read.

FIGS. 5A and 5B illustrate a typical address map created by the routine ADDRESS_UTILIZATION 200. As shown in FIG. 5A, this address map is an array containing four values for each address between 100h and 03FFh. For each address location, the routine ADDRESS_UTILIZATION 200 stores a main value in a flag DRIVEN, stores the initial read value from the I/O address in a location READ, and may or may not store values in locations LATCH corresponding to the value latched on a latched read and RISE corresponding to the timer value on a rise time check.

The initial address map as shown in FIG. 5A is created by the routine ADDRESS_UTILIZATION 200 at step 207. As can be seen, the routine has read all significant I/O addresses (100h–3FFh) and stored those read values in the second column (READ) of the address map. In memory, this is stored in the second byte of the four bytes of memory reserved for each I/O address tested. Also at step 207, the DRIVEN flag in the address map has been set to true (0FFh) for each I/O address that returns a value other than the undriven value of 0FFh. This indicates that it is known that this address location is driven. As can be seen, on the initial read, locations 104h–106h have returned values other than zero on the read, so the corresponding DRIVEN flag byte has been set to 0FFh.

FIG. 5B shows the address map after the routine CHECK_PRESENCE 212 has been executed for all of the "undriven" memory locations. This can be seen in relation to address 100h which, as seen in FIG. 5A, returned an "undriven" read value of 0FFh. In FIG. 5B, location 100h has returned a latched read value LATCH of 02h, as determined at step 300. This indicates that the slot 122 under test has an expansion board which has latched certain control lines in response to an I/O read, so DRIVEN for location 100h is also set to true. Note that no rise time measurement is made on location 100h, because the latch read has already indicated a utilized address.

For address 101h, both the read of the address at step 207 has returned an undriven value of 0FFh and the latch read has returned an undriven value of 00h. So, the rise time is checked at steps 310 and 312. In this case, a rise time of 05h is returned. Assuming the standard undriven rise time of the system is 01Ch, this rise time of 05h indicates that an expansion board is driving the data lines 116 to 0FFh in response to an I/O read from address 101h. Thus, DRIVEN for address 101h is set to true. Addresses 102h and 103h have also returned an undriven value of 0FFh on an I/O read from those addresses and a latch value of 00h. Those values have returned rise time values of 01Bh and 01Ch, however, and since the undriven bus rise time is 01Ch, both of these values correspond to an undriven rise time. (A rise time of 01Bh is within two clock values of the undriven rise time value, and is considered as being within an error margin for undriven values.) Thus, the locations DRIVEN corresponding to addresses 102h and 103h stay false. The same holds true for location 107h and 3FFh (and presumably for all intervening values).

The latched read value and rise time value need not be checked on I/O reads of location 104h–106h, as a read has returned driven values in response to an I/O read from those locations. The latch read is preferably performed for those locations anyway, as it might give extra information to assist the signature checking algorithms to determine the type of ISA board installed in the slot 122 under test.

Not shown are the corresponding address maps for the other slots 122 under test. A corresponding address map is created for each of these, and then those maps are passed further along to the higher level configuration routine CONFIG 400, as discussed above in conjunction with FIG. 2.

At this point, the routine ADDRESS_UTILIZATION 200 has created an address map indicating responding I/O addresses that each slot 122 drives when enabled.

Figure 6:
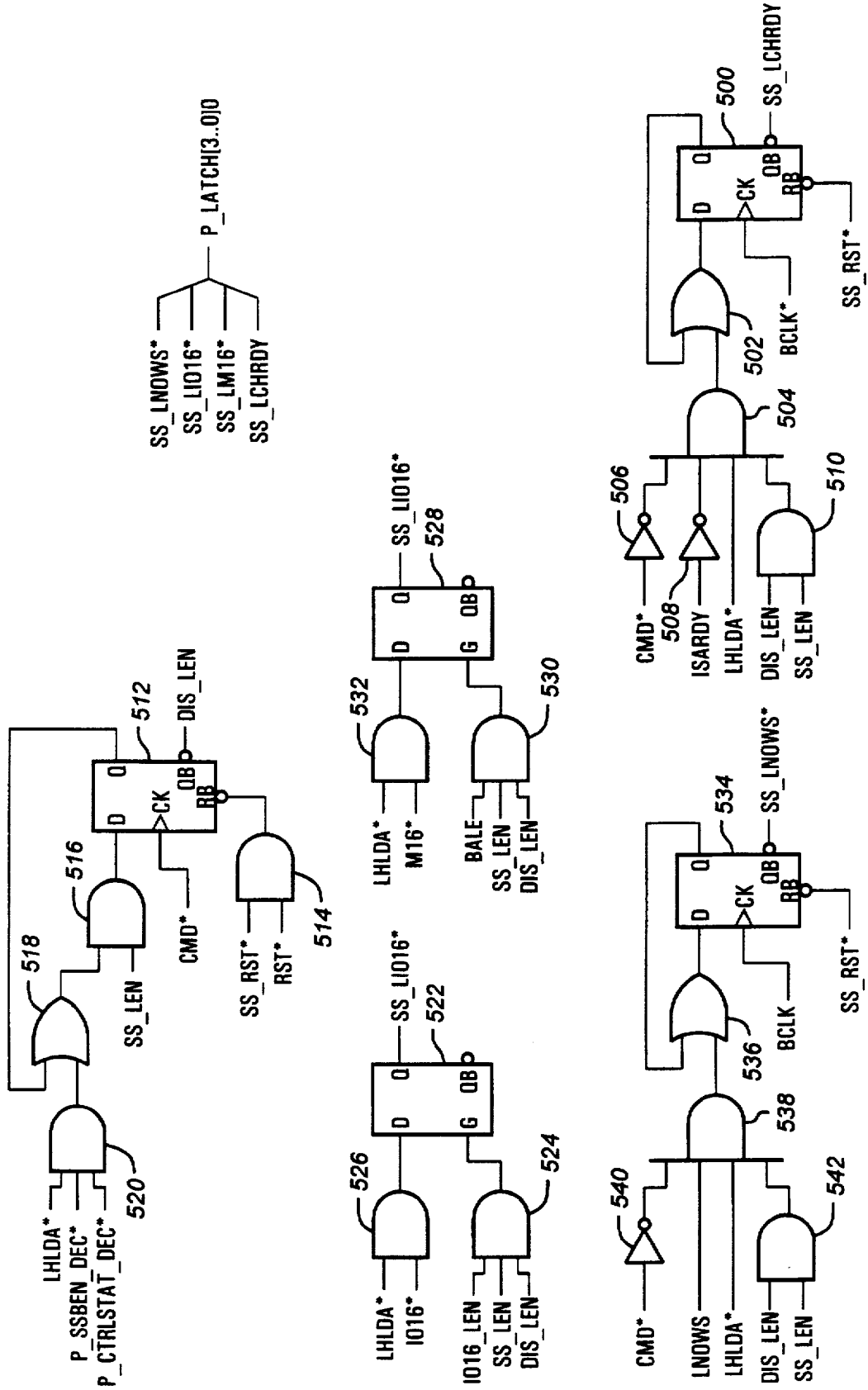
FIGS. 6 and 7 are schematics of the control line status latching circuitry used according to the invention.

Turning to FIG. 6, that figure is a schematic of the hardware for latching the control lines 118 on an I/O read at step 302 above. FIG. 6 shows latch control signals P_LATCH[3..0], which are driven onto the data lines 116 on an I/O read from P_CTRLSTAT. The hardware provides four signals SS_LNOWS*, SS_LIO16*, SS_LM16*, and SS_LCHRDY as these latch control signals, each of which is further described below. These signals correspond to the sampled values of the ISA bus no wait state signal NOWS*, input/output command signal IO16*, memory command signal M16*, and channel ready signal CHRDY when those signals are valid on an I/O read. An ISA board sometimes asserts these signals in response to an I/O read. If asserted, these signals thus indicate that an expansion board in the slot 122 under test is responding to a read from the particular I/O address under test.

Figure 7:
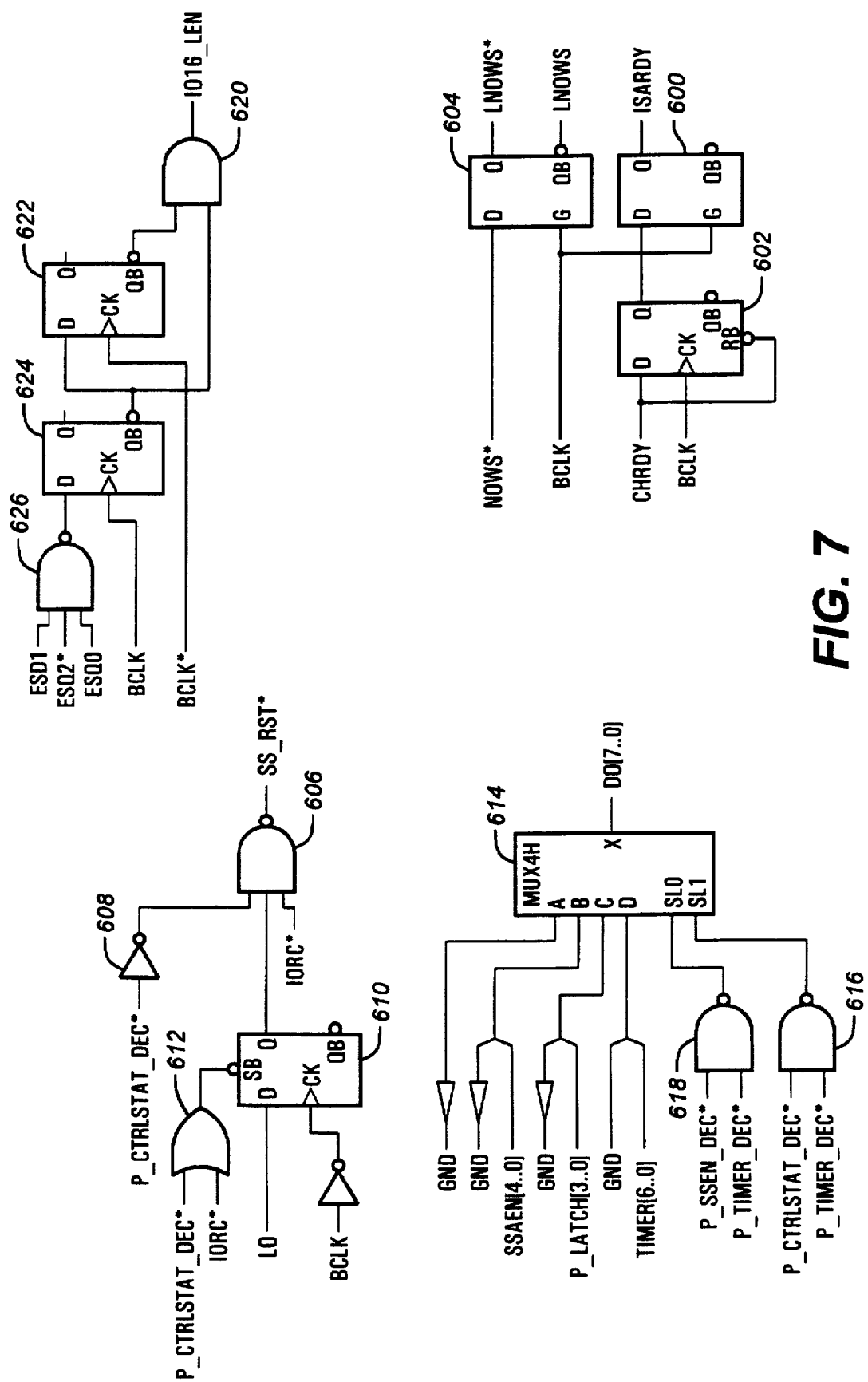

These signals provided as P_LATCH [3..0] are generated by the circuitry of the schematics shown in FIGS. 6 and 7. SS_LCHRDY is provided by the Q* output of a D flip-flop 500. The D flip-flop 500 is reset by a reset signal SS_RST*, discussed below, and is clocked by an inverted BCLK signal BCLK*. BCLK is a standard ISA clock signal, and generally runs at 8 MHz. An OR gate 502 drives the D input of the D flip-flop 500. The OR gate 502 receives as inputs the Q output of the D flip-flop 500 and the output of an AND gate 504.

The inputs to the AND gate 504 include the EISA bus command signal CMD* after being inverted by an inverter 506, a signal ISARDY (discussed below) after being inverted by an inverter 508, a latched host bus 102 HLDA signal LHLDA*, which is latched on the host bus clock signal HCLK by circuitry not shown, and the output of an AND gate 510. HLDA is true during memory refresh, DMA, and bus master cycles, when all of the circuitry of FIGS. 6 and 7 should be disabled. The AND gate 510 has as inputs a signal DIS_LEN (discussed below) and a status latching enable signal SS_LEN. SS_LEN reflects the value of a corresponding bit in the I/O register P_CTRLSTAT.

DIS_LEN, which disables status latching on reads from P_SSAEN and P_CTRLSTAT, is provided by the Q* output of a D flip-flop 512. The D flip-flop 512 is reset by a low signal out of an AND gate 514, which has as inputs SS_RST* and a system reset signal RST*. CMD* clocks the flip-flop 512. The D input to the D flip-flop 512 is provided by an AND gate 516, which as inputs receives SS_LEN, and the output of an OR gate 518. The inputs to the OR gate 518 are the Q output of the D flip-flop 512 and the output of an AND gate 520. The AND gate 520 receives as inputs LHLDA*, a decode P_SSAEN_DEC* for a read or write to P_SSAEN, and a decode P_CTRLSTAT DEC* for a read or write to P_CTRLSTAT.

SS_LIO16* is provided by the Q output of a latch 522, which is gated by an AND gate 524 with IO16_LEN, SS_LEN, and DIS_LEN as inputs. The D input to the latch 522 is provided by an AND gate 526, which has as inputs LHLDA* and IO16*.

SS_LM16* is provided by the Q output of a latch 528, which is gated by an AND gate 530 with inputs BALE, SS_LEN, and DIS_LEN. BALE is a standard ISA signal that indicates the validity of address values. The D input to the latch 528 is provided by an AND gate 532, which has as inputs LHLDA, and the ISA signal M16*. SS_LM16* can be ignored if only I/O reads are being mapped.

SS_LNOWS* is provided by a D flip-flop 534, which is reset by SS_RST* and is clocked by BCLK. The D input to the D flip-flop 534 is provided by an OR gate 536, which has as inputs the Q output of the D flip-flop 534 and the output of an AND gate 538. The AND gate 538 has as inputs CMD* after inversion by an inverter 540, LNOWS (the inverted latched value of an ISA no wait state signal NOWS*), LHLDA*, and the output of an AND gate 542, which has as inputs DIS_LEN and SS_LEN.

Turning to FIG. 7, ISARDY is provided by the Q output of a latch 600. BCLK gates a latch 600, which as its D input receives the Q output of a D flip-flop 602. CHRDY drives the reset input and the D input of the D flip-flop 602, and BCLK clocks the D flip-flop 602. A latch 604 provides LNOWS* and LNOWS at its Q and Q* outputs, is gated by BCLK, and as its D input receives NOWS*.

SS_RST* is provided by a NAND gate 606, which has as inputs P_CTRLSTAT_DEC* after inversion by an inverter 608, an ISA I/O read command signal IORC*, and the Q output of a D flip-flop 610. The D flip-flop 610 is clocked by BCLK* and has its D input pulled low. The D flip-flop 610 is reset by the output of an OR gate 612, which has as inputs P_CTRLSTAT_DEC* and IORC*. SS_RST* thus resets the latching circuitry when the latched values are read from P_CTRLSTAT.

IO16_LEN is provided by an AND gate 620, which has as inputs the Q* outputs of a D flip-flop 622 and a D flip-flop 624. The D flip-flop 622 is clocked by BCLK*, and its D input is driven by the Q* output of the D flip-flop 624. The D flip-flop 624 is clocked by BCLK, and its D input receives the output of a NAND gate 626, which has as inputs the signals ESD1, ESQ2*, and ESQ0, which are outputs of a state machine that is not shown. This state machine tracks the command state of the ISA bus. These signals cause IO16_LEN to go high on the first rising edge of BCLK after IOWC* or IORC* is asserted, and to then go low on the next falling edge of BCLK. This circuitry is well known to one of ordinary skill in the art of expansion bus design. IO16* is then latched on the falling edge of IO16_LEN.

An eight-line, four-input multiplexer 614 provides as outputs the signals DO[7..0]. These signals are driven onto the data lines 116 by circuitry not shown in response to I/O reads of P_CTRLSTAT, P_TIMER, or P_SSAEN. The lower 4 bits of the C input to the multiplexer 614 receive P_LATCH[3..0], with ground tied to the other bit inputs. The D input receives TIMER[6..0], with ground tied to the eighth bit input. The select lines for the multiplexer 614 are driven by a NAND gate 616 to the select line 1 and a NAND gate 618 to the select line 0. The NAND gate 616 receives as inputs P_CTRLSTAT_DEC* and P_TIMER_DEC*, while the NAND gate 618 receives as inputs P_SSAEN_DEC* and P_TIMER_DEC*.

The multiplexer 614 provides DO[7..0] corresponding to the signals P_LATCH[3..0] when P_CTRLSTAT_DEC* is low, and the signal TIMER[6..0] is provided as DO[7..0] when a read is detected by a decode of the signal P_TIMER_DEC*, as both the NAND gate 616 and the NAND gate 618 are driven high. This hardware thus allows the microprocessor 106 to read the values of the latch register and the timer register.

Memory addresses are mapped in a way similar to that illustrated in FIGS. 2–5B, with the exception that instead of determining presence as shown in FIG. 4, two distinct values, such as 00h and 0FFh, are consecutively written to and read from the memory address under test. If the memory address on each subsequent read returns the written value, that indicates the memory address is present. If the memory address does not return one of those values on a read, that indicates the memory address is not driven by the board under test. The corresponding address map is set up to FIGS. 5A and 5B, with the exception that the "latch" and "rise" values need not be stored, and instead just a presence or absence flag is stored. This address map is then used by the CONFIG routine 400 of FIG. 2.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. A method for determining whether a slot on a computer system bus contains an expansion board responsive to a read from an I/O address in a computer system with the computer system bus including data lines, address lines, control lines, and a plurality of individually selectable slots, the data lines when undriven returning a predetermined value in response to a read and when undriven having an associated response time to a read, and including a processor for reading from the bus and executing configuration software, comprising the steps of:

(a) enabling the slot;
   (b) performing a read from the I/O address using the address lines and a portion of the control lines to assert an address and request a read, and where a data value is returned on the data lines in response to the read;
   (c) if the read from the I/O address returns a data value on the data lines that corresponds to a read from the data lines when undriven, performing a second read from the I/O address using the address lines and a portion of the control lines to assert the address and request the read while measuring the response time of the data lines to the read;
   (d) comparing the response time of the data lines to the read from the I/O address with the response time of the data lines when undriven; and
   (e) if the response time of the data lines to the read from the I/O address is shorter by at least a predetermined amount of time than the response time of the data lines when undriven, indicating the expansion board responded on the data lines to the read from the I/O address.

2. The method of claim 1 further comprising a step before step (d) of if the read from the enabled slot returned a data value corresponding to a read from the data lines when undriven, performing a read of the address while latching a portion of the control lines of the bus, determining whether an expansion board is responding to the read of the I/O address by examining whether the control lines were asserted and if any control lines were asserted, indicating the expansion board responded to the read of the I/O address.

3. The method of claim 1, wherein steps (a) to (d) are repeated for a predetermined range of I/O addresses.

4. The method of claim 1, further comprising the steps of:
   (f) generating an address map in response to the results of steps (a) through (e);
   (g) comparing the address map generated in step (f) with a library of expansion board signatures stored in the computer system; and
   (h) determining, based on said comparison of step (f), the type of expansion board installed and its responsive address locations.

5. The method of claim 4, further comprising the step of:
   (i) repeating steps (a) through (h) for each of the plurality of individually selectable slots.

6. The method of claim 4, further comprising the step of:
   (i) passing the results of said determining the type and address map of expansion boards installed to configuration software that configures the system.

7. A system for configuring expansion boards, comprising:
   a system bus with a plurality of individually enableable slots for expansion board, said system bus including data lines, address lines, and control lines;
   a processor coupled to said system bus for executing a configuration program and using the address lines and a portion of the control lines to execute reads from addresses, where the reads return values on the data lines;
   means for configuring expansion boards installed in some of the plurality of slots based on the types of the expansion boards; and
   means for determining the types of expansion boards installed in the plurality of slots, including:
      means for enabling one of the individually enableable slots;
      means for creating an address map of addresses used by an expansion board installed in the one of the individually enableable slots, wherein said means for creating indicates that an address in the address map is "undriven" if a read from that address returns on the data lines a data value normally returned on the data lines by a read when the data lines are undriven;
      means for determining if an expansion board installed in the one of the individually enableable slots is responding on the data lines to a read from an address that the address map indicates "undriven"; and
      means for comparing the address map with expansion board signatures to determine the type of expansion board installed in the one of the plurality of individually enableable slots.

8. A method for determining whether a slot on a computer system bus contains an expansion board responsive to a read from a memory address in a computer system with the computer system bus including data lines, address lines, control lines, and a plurality of individually selectable slots, the data lines when undriven returning a predetermined value in response to a read and when undriven having an associated response time to a read, and including a processor for reading from the bus and executing configuration software, comprising the steps of:

(a) enabling the slot;

(b) determining if the expansion board responds on the data lines to a read from the memory address, wherein the read from the memory address is initiated using the address lines and a portion of the control lines and wherein the read returns a data value on the data lines, said determining including determining if the expansion board responds on the data lines to the read from the memory address when the read from the memory address returns on the data lines the predetermined value by comparing the undriven response time of the data lines to a response time of the data lines to the read from the memory address;

(c) repeating steps (a) to (b) for a predetermined range of memory addresses;

(d) generating an address map in response to the results of steps (a) through (c);

(e) comparing the address map generated in step (d) with a library of expansion board signatures stored in the computer system; and (f) determining, based on said comparison of step (e), the type of expansion board installed and its responsive address locations.

9. The method of claim 8, further comprising the step of:

(g) repeating steps (a) through (f) for each of the plurality of individually selectable slots.

10. The method of claim 8, further comprising the step of:

(g) passing the results of said determining the type and address map of expansion boards installed to configuration software that configures the system.

* * * * *

UNITED STATES PATENT AND TRADEMARK OFFICE
CERTIFICATE OF CORRECTION

PATENT NO. : 5,537,663
DATED : July 16, 1996
INVENTOR(S) : BRIAN V. BELMONT and BARRY S. BASILE It is certified that error appears in the above-identified patent and that said Letters Patent is hereby corrected as shown below:

In column 14, line 26, please delete "board" and insert in its place --boards--.

Signed and Sealed this

Eighteenth Day of February, 1997

Attest:

BRUCE LEHMAN

Attesting Officer          Commissioner of Patents and Trademarks